(12) United States Patent
Smith

(10) Patent No.: US 7,697,454 B2
(45) Date of Patent: Apr. 13, 2010

(54) METHOD AND APPARATUS FOR CONTROLLING THE DISSEMINATION OF ROUTING INFORMATION ON A COMMUNICATION NETWORK

(75) Inventor: Peter Ashwood Smith, Hull (CA)

(73) Assignee: Avaya, Inc., Basking Ridge, NJ (US)

(*) Notice: Subject to any disclaimer, the term of this patent is extended or adjusted under 35 U.S.C. 154(b) by 1050 days.

(21) Appl. No.: 10/757,139

(22) Filed: Jan. 14, 2004

(65) Prior Publication Data

US 2005/0152333 A1  Jul. 14, 2005

(51) Int. Cl.
*H04L 12/28* (2006.01)
(52) U.S. Cl. ........................... 370/254; 370/400
(58) Field of Classification Search .............. None
See application file for complete search history.

(56) References Cited

U.S. PATENT DOCUMENTS

| | | | |
|---|---|---|---|
| 6,850,486 B2* | 2/2005 | Saleh et al. | 370/218 |
| 2004/0120355 A1* | 6/2004 | Kwiatkowski | 370/506 |
| 2004/0174825 A1* | 9/2004 | Li et al. | 370/254 |
| 2007/0053300 A1* | 3/2007 | Zhu et al. | 370/238 |

OTHER PUBLICATIONS

Y. Jia, *Scalable QoS Routing Using Alternative Paths* (undated).

F. Baker, *Problem Statement for OSPF Extensions for Mobile Ad Hoc Routing*, Internet Engineering Task Force (IETF) Internet-Draft, Sep. 2003.

A. Zinin, *Alternative Implementations of OSPF Area Border Routers*, IETF Request for Comments (RFC) 3509, Apr. 2003.

* cited by examiner

*Primary Examiner*—Jayanti K Patel
*Assistant Examiner*—Jung Park
(74) *Attorney, Agent, or Firm*—Anderson Gorecki & Mararas, LLP

(57) ABSTRACT

The propagation of link state advertisements (LSAs) is limited by defining a propagation radius on the network, measured by sum of link cost, or using another metric. By limiting the distance a LSA will propagate on the network it is possible to limit LSA traffic on the network without defining areas on the network. This eliminates the need to name those areas and designate nodes as belonging to particular areas, which enables the nodes to be added on an ad-hoc basis without a centralized management structure. Additionally, this enables the nodes to be mobile on the network without requiring close monitoring and updating of area affiliation by the nodes. Further, not having areas on the network eliminates the requirement for area border routers to control link state advertisements, reduces or eliminates special intra-area communication protocol exchanges, and avoids potential congestion which may occur in connection with inter-area traffic.

14 Claims, 4 Drawing Sheets

METHOD AND APPARATUS FOR CONTROLLING THE DISSEMINATION OF ROUTING INFORMATION ON A COMMUNICATION NETWORK

BACKGROUND OF THE INVENTION

1. Field of the Invention

The present invention relates to communication networks and, more particularly, to a method and apparatus for controlling the dissemination of routing information on a communication network.

2. Description of the Related Art

Data communication networks may include various computers, servers, nodes, routers, switches, bridges, hubs, proxies, and other network devices coupled to and configured to pass data to one another. These devices will be referred to herein as "network elements." Data is communicated through the data communication network by passing protocol data units, such as Internet Protocol packets, Ethernet Frames, data cells, segments, or other logical associations of bits/bytes of data, between the network elements by utilizing one or more communication links between the devices. A particular protocol data unit may be handled by multiple network elements and cross multiple communication links as it travels between its source and its destination over the network.

There exists a class of networks in which traffic patterns are very focused. In particular, the traffic in these networks generally flows either from a well known focal point out to all the other nodes, or the reverse, from all those nodes back to the focal point. In these networks rarely, if ever, does traffic flow in any other pattern. One example of a network that generally exhibits these characteristics is a wireless ad-hoc network containing a network of wireless routers spanning a neighborhood and providing wireless access to individual users in the neighborhood, although the invention is not limited to an implementation in this particular type of network.

FIG. 1 illustrates a network 10 in which a focal point F 12 acts as an interface between a group of network elements (nodes) 14 interconnected in a mesh network configuration and an external network 16. In the following discussion, the focal nodes will be assumed to be access points to resources external to the network 16. For example, the focal nodes may contain a direct link to higher bandwidth resources of the Internet or the Public Switched Telephone Network (PSTN). Alternatively, the focal nodes may be a transmission point between a lower level mesh network interconnecting the nodes 14, and an upper level mesh interconnecting the focal points 12. The invention is not limited to this embodiment however.

The network elements 14 may be wireless access devices or other types of network elements. Within the mesh, the network elements are typically homogenous devices having approximately equal capacity. For example, the network elements may be wireless routers configured to transmit wireless signals using a particular protocol. Since the protocol defines the transmission bandwidth available over a given link between adjacent nodes, the network elements in this instance are practically limited to the protocol definition regardless of their physical capabilities.

Routing information on a network, such as the network illustrated in FIG. 1, may be exchanged using a variety of different protocols. Two classes of routing protocols include distance vector and link state routing protocols. The invention discussed below will be discussed in particular as applying to link state routing protocols. The invention is not limited in this regard, though, as it may also be applied to distance vector routing protocols.

Routing Information Protocol (RIP) is one example of a distance-vector routing protocol in which routers broadcast their entire current routing tables periodically, typically every 30 seconds. The messages contain lists of destination routers along with a distance to that destination measured in the number of hops to the destination. Optionally, other metrics may be used to measure the distance to the destination. In a large network, RIP may experience problems in that routing update messages propagate very slowly through the network and it may take a long time for the network to converge after a modification to the network, such as a link or node failure.

Link state routing protocols are different than distance vector protocols in that update messages are used to advertise routing information, but each router only advertises information about links to which it is connected. Update messages will be referred to herein as Link State Advertisements (LSAs). Link State routers maintain topology databases containing representations of every link and router in the network, and a state for each element. Examples of common link state routing protocols include Open Shortest Path First (OSPF) and Intermediate System to Intermediate System (IS-IS), although the invention is not limited to these example link state routing protocols.

Link state routing protocols, such as OSPF or IS-IS, work well in small networks. In a large network, however, with hundreds or thousands of routers and multiple times that many links, the overhead associated with exchanging LSAs may become prohibitive. Specifically, every time the state of one of the links in the network changes, a LSA will be flooded to every node on the network to ensure that every node on the network is able to update its link state table. Delays attendant with exchanging link-state messages, updating databases, and recalculating routes may cause topology convergence to be delayed on the network. Additionally, the larger the network the larger the link state database that must be created and maintained by the nodes on the network.

To alleviate this problem, the concept of OSPF areas was developed. OSPF areas are logical subdivisions of an OSPF network. OSPF routers within one area do not exchange topology updates with the routers in the other areas, to thereby limit the number of routers that are required to exchange LSAs. The logical partitioning is advantageous in that it limits the number of LSAs distributed on the network, limits the size of the link state databases maintained by the nodes, and accelerates topology convergence.

FIG. 2 illustrates a network 20 which has been partitioned into several OSPF areas 22. As shown in FIG. 2, each area contains a finite number of network elements 14. Link state advertisements, such as an advertisement relating to link Wi-Wk 24, may propagate within the area 22 but will not be advertised outside of that area.

Routers that sit on the border between adjacent OSPF areas are referred to as area border routers 26 or border gateways. In FIG. 2, the area border routers are colored solid black. Area border routers filter for topology updates and prevent LSAs from passing between domains. Area border routers maintain a topology database for both OSPF areas (or multiple topology databases where they sit on a border with more than 2 OSPF areas) to enable paths through the network to traverse the several OSPF areas. Area border routers communicate with each other using special link-state messages that contain a shorthand summary of the topologies of their respective areas.

In a wireless ad-hoc network, it may be difficult to define where the OSPF areas should be drawn. Specifically, one of the advantages of the ad-hoc nature of the network is that extensive planning does not need to take place. This is in direct contravention with the wisdom that has built up with defining OSPF areas and the careful planning that takes place in conventional OSPF networks.

Additionally, since most, if not all, of the network access points in an envisioned ad-hoc wireless network will be of relatively uniform capacity, designating one or more wireless network nodes as an area border router may cause artificial congestion in the network. Specifically, by designating a particular router as an area border router, all traffic that is to pass from one area to another is required to go through that area border router. Artificially concentrating traffic on one or a small number of routers presents a likely congestion problem at those router(s). While traffic engineering may be used to balance traffic on the various links leading to the area border router, it does not alleviate the congestion at that node.

Utilizing area border routers in an ad-hoc network with focal-node centric flow patterns is more troublesome. Specifically, where the vast majority of the traffic on a network is directed to or from a focal node, if that node is to fail, the traffic will need to be directed to another focal node. Where this traffic needs to traverse a border to find a focal node, all the traffic from the area may be required to pass through the area border router, which may further contribute to congestion in the area border router. While area border routers in conventional networks are conventionally of a higher capacity to handle the expected aggregate loads, this is difficult to do in an ad-hoc network with an intentional lack of centralized management and planning.

Defining areas in a network also introduces yet another problem, especially in ad-hoc networks. Specifically, whenever a network is defined to have areas, it becomes necessary to name the areas and tell the routers what area they belong to. In an ad-hoc network where a lack of centralized planning and management is one of the goals, requiring the nodes to be provisioned with area IDs makes deployment of the ad-hoc network more onerous. Additionally, where the nodes are mobile, keeping track of the node's location and its area IDs becomes even more difficult from a centralized management standpoint.

SUMMARY OF THE INVENTION

The present invention overcomes these and other drawbacks by providing a method and apparatus for controlling the dissemination of routing information on a communication network. According to an embodiment of the invention, Link State Advertisements (LSAs) in a link state routing protocol are permitted to be forwarded a limited distance on the network and then are no longer forwarded on the network. This enables link state advertisement distribution to be limited to permit the overhead associated with LSA distribution to be contained, while preventing the artificial creation of boundaries in the network. Thus, traffic congestion at the artificial boundaries may be avoided, especially in networks such as ad-hoc wireless networks. Additionally, by eliminating link state areas, there is no need to provision nodes on the network with area IDs. This is especially beneficial in a network such as an ad-hoc network in which one of the primary advantages of the network structure is the elimination of centralized management structure.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

DETAILED DESCRIPTION

The following detailed description sets forth numerous specific details to provide a thorough understanding of the invention. However, those skilled in the art will appreciate that the invention may be practiced without these specific details. In other instances, well-known methods, procedures, components, protocols, algorithms, and circuits have not been described in detail so as not to obscure the invention.

According to an embodiment of the invention, link state advertisements are limited to propagate a maximum acceptable radius from the source of that link state advertisement. By limiting the distance a Link State Advertisement (LSA) will propagate on the network it is possible to limit LSA traffic on the network without defining areas on the network. Not having areas on the network eliminates the need to name those areas and designate nodes as belonging to particular areas. This enables the nodes to be added to the network on an ad-hoc basis without a centralized management structure. Additionally, this enables the nodes to be mobile on the network without requiring close monitoring and updating of area affiliation by the nodes. Further, not having areas on the network eliminates the requirement for area border routers to control link state advertisements, reduces or eliminates special intra-area communication protocol exchanges, and avoids potential congestion which may occur in connection with inter-area traffic. Limiting LSA propagation in this manner may be particularly advantageous in a network in which traffic is naturally directed primarily to/from a limited number of focal points on the network.

In the following description, implementation of radius limited LSA flooding may in particular instances be described in connection with a common link state protocol, referred to herein as Open Shortest Path First (OSPF). Likewise, in particular portions of the description, OSPF specific terminology may occasionally be used to describe one or more embodiments of the invention. The invention is not limited to an embodiment that utilizes OSPF as the routing protocol however, or that is configured to use OSPF as a link state routing protocol. Rather, other routing protocols such as Intermediate System to Intermediate System (IS-IS) and other link state and/or distance vector protocols may be used as well. Thus, the terms used herein to describe OSPF embodiments should be interpreted to include similar constructs and concepts in these other routing protocols.

Figure 3:
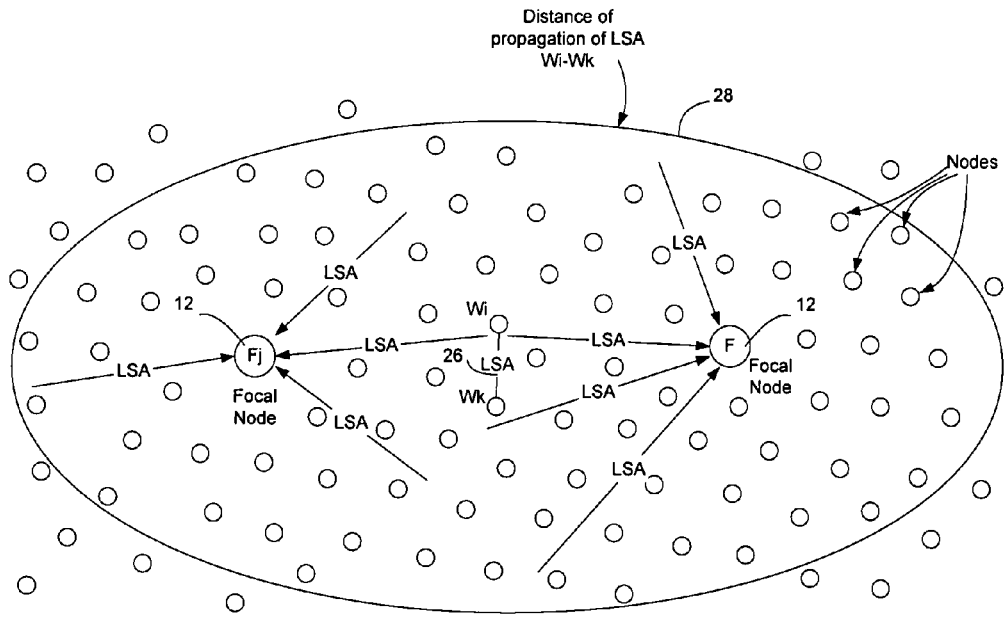
FIG. 3 is a functional block diagram of a portion of a communication network in which distance limited flooding of link state advertisements is used in place of link state protocol areas.
Figure 4:
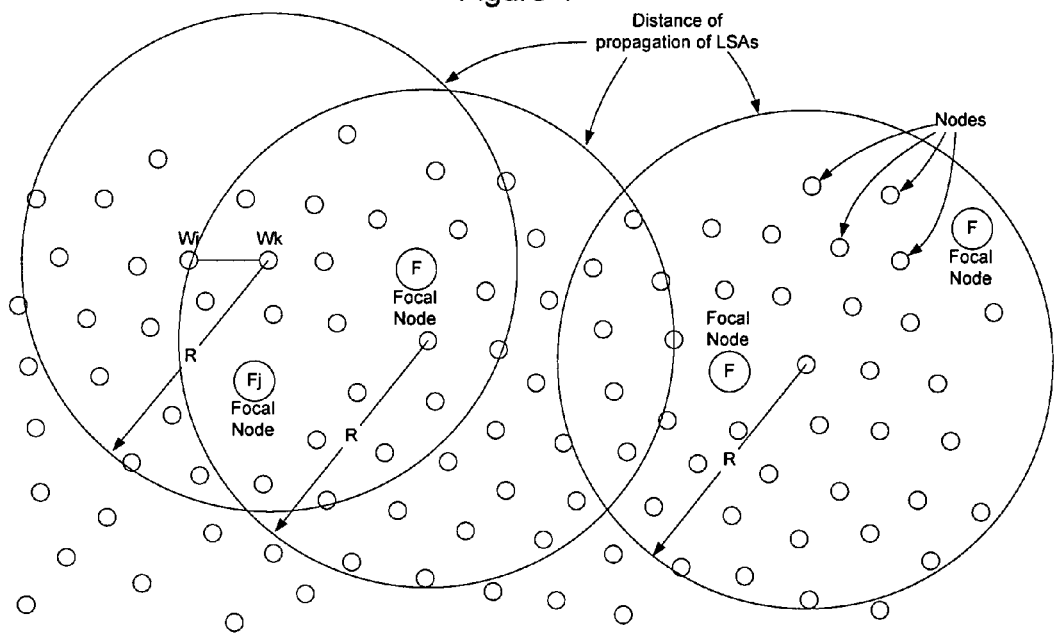
FIG. 4 is a functional block diagram of a portion of a communication network illustrating the radius of flooding of link state advertisements for several nodes on the network.

FIG. 3 illustrates an example of a network in which LSA flooding is bounded without requiring OSPF areas to be defined. Specifically, as shown in FIG. 3, advertisement of the link Wi-Wk 24 will propagate a particular distance on the network 28 and then not propagate any further. This may be done, for example as discussed in greater detail below, by defining a maximum flood radius for the LSA.

Defining a maximum flood radius implies that flooding of LSAs is bounded and that only nodes inside the diameter of the flood will be able to reach that node and vice-versa. In a network where the majority of the traffic emanates from or is directed to focal-nodes, this limitation is acceptable. For example, in the network of FIG. 3, assume that the vast majority of the traffic is directed toward or emanates from the focal points 12. If the diameter is chosen such that any node on the network is able to reach at least two focal nodes, redundant focal nodes and hence redundant paths may be provided to every node on the network. Constraining LSA dissemination without imposing artificial boundaries on the network, however, eliminates the need to have this aspect of the network centrally managed.

The radius may be fixed in advance at a value that is intended to be sufficient to enable the link state advertisements to reach two focal nodes (and conversely for the link state advertisements to reach the nodes). In this embodiment, the link state advertisements are configured to propagate a predetermined distance on the network regardless of the density of the focal points in a particular area. From an implementation standpoint this solution results in a relatively straight-forward implementation but may result in an overabundance of link state advertisement exchanges particularly in ad-hoc networks with a non-homogenous distribution of focal points.

Figure 5:
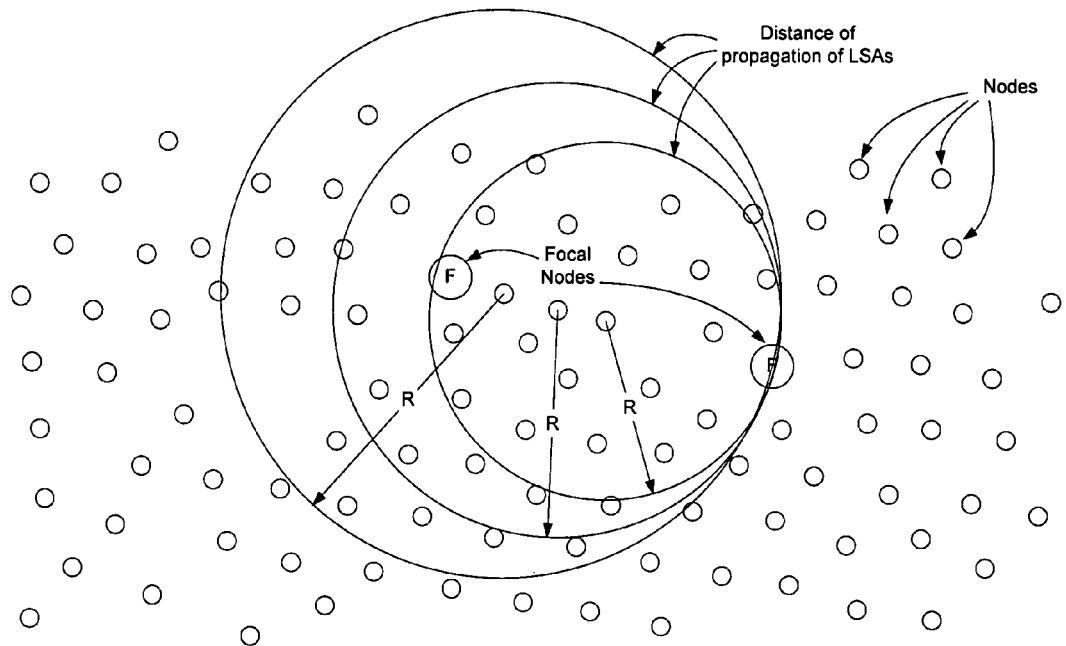
FIG. 5 is a functional block diagram of a portion of a communication network illustrating variable radius flooding of link state advertisements for several nodes on the network.

In an alternative embodiment, illustrated in FIG. 5, the radius for link state advertisements may be determined by the network nodes and adjusted as the network changes. For example, assume that one stated requirement is that every node on the network should have a link state radius suitable to enable link state advertisements to reach two focal nodes. This may be advantageous for redundancy purposes. Upon joining the network, a node may listen for link state advertisements from adjacent network nodes to determine where the focal points are on the network. The node may then set the link state advertisement radius to be such that the link state advertisement will travel to the focal nodes and other nodes in the surrounding area but no further. For nodes adjacent one focal node and far away from another focal node, the link state advertisements will thus travel farther on the network, while a node intermediate two focal nodes may have its link state advertisements travel a shorter distance on the network. This may result in an overall savings in link state advertisements. For a network in which the vast majority of traffic is oriented toward the focal points, the differing LSA distribution radii should not cause routing problems.

Similarly, in networks with a non-homogenous distribution of focal nodes, nodes in a region of relatively higher density focal node concentration will have a relatively shorter link state advertisement radius than nodes in a relatively sparser density focal node concentration. The invention is not limited to one of these embodiments as other methods of determining the LSA propagation limits may be used as well.

Where one of the focal nodes experiences failure, providing a link state advertisement radius sufficient to encompass two focal nodes enables the node to continue communicating on the network by instead causing its focal node directed traffic to pass through the alternative focal node. Optionally, upon failure of a focal node, where a variable radius link state advertisement mechanism is used, the radius may be increased to encompass a tertiary backup focal node as well, although the invention is not limited to this embodiment.

Optionally, as discussed in U.S. patent application Ser. No. 10/745,886, filed Dec. 23, 2003, and entitled Source-Implemented Constraint Based Routing with Source Routed Protocol Data Units, the content of which is hereby incorporated herein by reference, traffic engineering may be performed on traffic emanating from or directed to the focal nodes by causing those focal nodes to maintain link state tables and allocate reservations on the links within the network. Where LSAs distribution is limited on the network, the focal nodes will perform traffic engineering on routes that pass through them and for nodes that are visible to them on the network. The invention is not limited to Focal Point implemented traffic engineering as other traditional traffic engineering techniques may be used as well, such as OSPF-TE (Open Shortest Path First—Traffic Engineering) or MPLS-TE (MultiProtocol Label Switching—Traffic Engineering).

Within a network, all nodes that receive a link state advertisement will perform shortest path first routing so that all nodes along the shortest path to the focal points within the radius can reach them and all will agree on the path. Thus, no loops will be formed due to the limited flooding of the link state advertisements. Additionally, any constraints propagated along with the link state advertisements will also only propagate within the radius and thus traffic engineering such as MPLS-TE or OSPF-TE, or focal point based traffic engineering, will work. Additionally, where the definition of the radius is the sum of link cost, all nodes along the shortest path will compute the same shortest path, and thus IP hop-by-hop routing may be used in addition to constraint-based routing.

Figure 6:
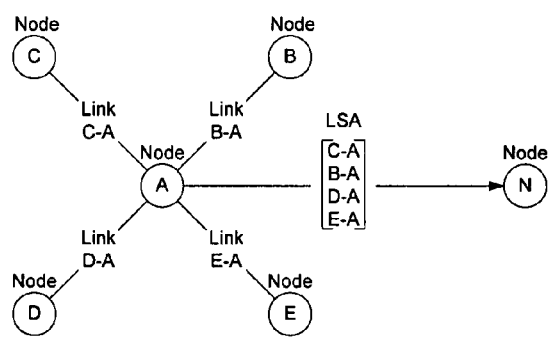
FIG. 6 is a functional block diagram illustrating transmission of a link state advertisement from a generating node to a receiving node.

Several different mechanisms may be used to determine whether a link state advertisement should be sent to a neighbor. For example, as shown in FIG. 6, assume an LSA originated at a node A with neighbors B, C, D, and E and is subsequently received at a distant node N. As shown in FIG. 6, the LSA in this example will contain information about links B-A, C-A, D-A, and E-A. Node N will need to determine if the LSA should continue to be advertised on the network or dropped, and optionally, whether the information contained in the LSA should be included in its routing tables. This decision is required for both LSA flooding and database synchronization in OSPF.

According to one embodiment of the invention, the nodes receiving a link state advertisement make a determination whether the link state advertisement should continue to propagate on the network. This may be done in several ways. For example, a node receiving an LSA may inspect the LSA to determine if the distance, cost, or other metric associated with information contained in the LSA is such that the LSA should continue to propagate past that node. In this embodiment a node-based mechanism is used to determine how far the LSA has traveled on the network. Alternatively, the LSA may contain a distance traveled indicator that may be incremented or decremented each hop on the network. In this embodiment, the distance mechanism is included in the LSA and used by the nodes to determine how to handle the LSA or the information contained in the LSA. The invention is not limited to these two embodiments as other embodiments or a combination of these embodiments may be possible as well.

The node may also need to determine whether to include the information contained in the LSA in its routing tables. For example, in an embodiment of the invention, nodes on the network may be configured to only drop LSAs that do not contain relevant information and pass all other LSAs on the network. In this embodiment, the LSAs will need to determine whether the LSA contains information that is relevant to the node, or if the information contained in the LSA relates to links that are outside of its routing tables. This may be accomplished in several ways. In one embodiment, the node may include a rule that no link more than a given number of hops away will be included in its routing tables. Similarly, where hop-by-hop routing is being used on the domain, the node may include a rule that no link more than a particular sum of link costs away will be included in its routing tables. The invention is not limited to one of these embodiments, however, as other metrics may be used as well (as discussed in greater detail below).

In another embodiment, nodes are configured to input all information from LSAs received on the network into their routing tables, but are configured to only propagate the LSAs on the network where the information contained in the LSA is not likely to exceed the LSA propagation radius discussed herein. This embodiment has the advantage of limiting the number of LSAs on the network by not propagating LSAs that are not likely to be relevant to any other nodes on the network.

LSA propagation may be measured in many different ways. For example, the propagation distance may be measured by the sum of link costs. This sum of link cost metric may be particularly advantageously employed where hop-by-hop routing is being used. Other metrics which may be used in other domains may include the number of hops, the sum of the distances of the hops, the cost of the hop, time to live, geographic distance, relevance (size of link times distance away on network), originator status (link to focal node v. inter-node link), priority level of originator, type of link being advertised, and other similar network or link descriptive metrics. These metrics may be advantageously employed where source routing or other types of routing are being used in the domain. The invention is thus not limited to any one particular metric or to the particular implementations described herein, and selection of an appropriate metric may depend on the type of routing being used on the domain.

Additionally, different types of links may propagate different distances on the network by using a different value, different metric, or different mechanism to measure the metric for the different types of links. For example, where the LSA includes a distance traveled indicator, the amount the distance traveled indicator is altered by the nodes may vary depending on the type of link being advertised. Thus, a given LSA may include several link dependent distance traveled indicators for the several links being advertised. This links will thus propagate different distances on the network. This may be used, for example, to disseminate the location of focal nodes farther on the network than links leading to other types of nodes on the network.

Figure 7:
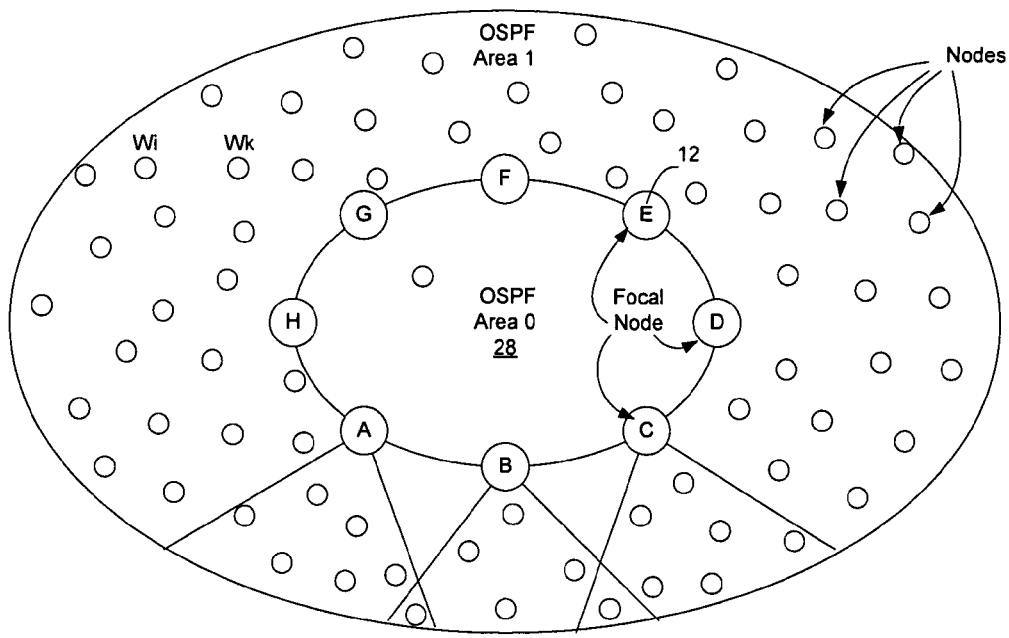
FIG. 7 illustrates an implementation of distance limited flooding of link state advertisements where focal points are area border routers onto the backbone of the communication network.

Embodiments of the invention may be used in many different network topologies. For example, FIG. 7 illustrates a network topology in which numerous focal nodes 12 are arranged to talk with each other over a backbone area 28. This is a very common topology for example in conventional OSPF networks. According to one embodiment of the invention, areas outside of the backbone are not rigidly defined, but focal nodes act as area border routers to connect their ad-hoc area to the backbone so that the other well established organizational mechanisms of OSPF may continue to be used.

For example, in this embodiment, each focal node acts as an area border router between itself and the backbone. Each node on the network is in one or more regions, the regions being defined as that portion of the network that is able to receive link state advertisements from one of the focal nodes. If a reciprocal link state advertisement radius is used for advertisement to and from the focal node, the focal node will similarly know the link states for links attached to the nodes. Thus, each focal node will respond to link state advertisements from nodes in its region as if those nodes were in its area. Accordingly, each focal node will summarize and flood link state advertisements from the focal nodes that it is able to receive onto backbone in a normal manner. Similarly, each focal node will summarize and flood link state advertisements from the backbone into its region. In this manner, normal OSPF backbone concepts may be used to continue to disseminate LSA information throughout the network while not rigidly defining areas in the network. Instead, the areas become self defining based on the link state advertising limitations established as discussed herein.

By allowing link state advertising to propagate a particular distance, many of the nodes may appear to be reachable by more than one focal node. This increases redundancy on the network by creating and advertising duplicate paths to the nodes. Additionally, the number of nodes outside of the backbone is not limited to a particular predefined number as increasing the number of nodes does not result in a requirement to create new area mappings for the nodes, etc. Thus, centralized management is reduced. Additionally, rapid changes in the node topology may be accommodated since there is no reason to maintain a centralized management assignment of nodes to OSPF areas. Thus, motion of nodes is more feasible than without the LSA radius limit. Finally, focal nodes are able to see the full topology of the network within the radius of themselves, and therefore can perform constraint based routing to those nodes for traffic passing between the nodes and the focal point, without requiring traffic engineering to be instigated within the area. Alternatively, other forms of traffic engineering may be used as well and the invention is not limited to using focal-node traffic engineering.

Figure 1:
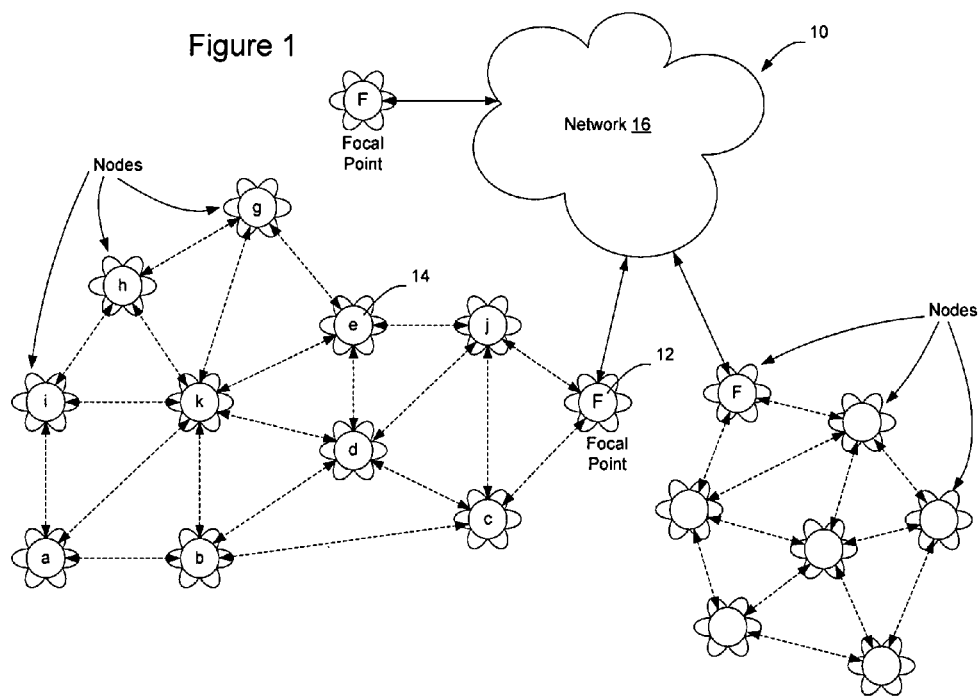
FIG. 1 is a functional block diagram a portion of an example communication network.
Figure 2:
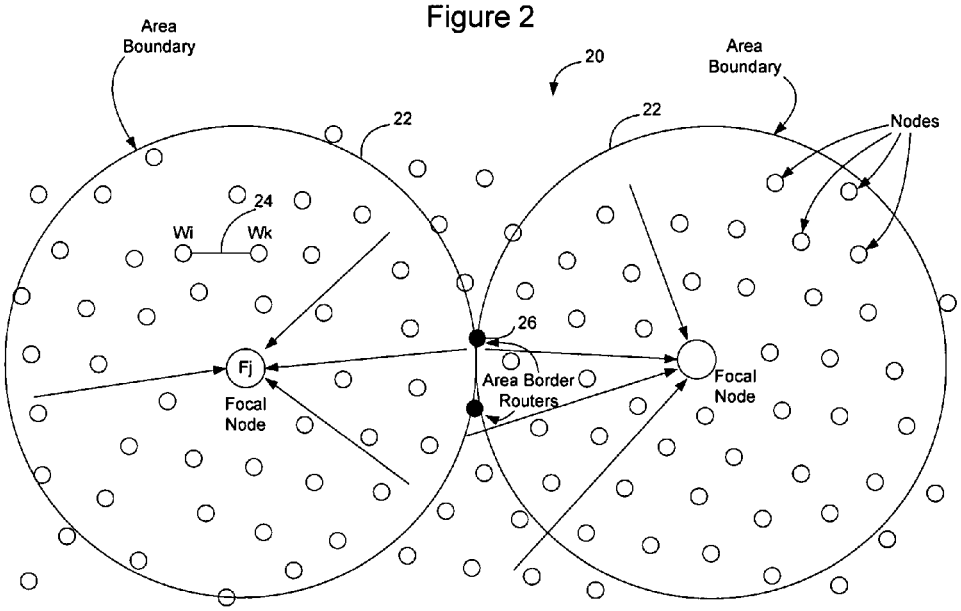
FIG. 2 is a functional block diagram of a portion of a communication network illustrating link state protocol areas in the network.

As shown in FIG. 1, a focal node 10 is connected by links 12 to other nodes 14 within domain 16. In the example illustrated in FIG. 1, there is one focal node in domain 16, although the invention is not limited to this particular example. The nodes 14 are connected to each other by links 12 as well to form a mesh within domain 16. The invention is not limited to a mesh topology. The focal node 10 is connected by relatively higher bandwidth resources 18 to a high speed communication resource 20 such as the Internet or Public Switched Telephone Network (PSTN). Other focal nodes 10 provide access to their respective domains 16 as well. The nodes in domain 16 have been provided with reference characters a-k. Focal node F may be considered a node within the domain 16 or may be considered a node on the border of the domain 16.

Distance limited flooding of LSAs may be implemented on many different types of networks. For example, one type of network that may particularly benefit from implementation of this form of routing information dissemination limitation is a wireless ad-hoc network, although the invention is not limited to this type of network.

Wireless ad-hoc networks may be formed in many ways. One way is to distribute wireless access points, and allow the wireless access points to self-configure themselves in a mesh topology. A mesh topology, as that term is used herein, enables many-to-one connectivity to provide a multiplicity of paths through the network. Mesh networks are advantageous in that they enable a given connection to be carried on a number of distinct paths through the network instead of requiring the connection to be carried over one or a limited number of paths through the network. Although this is one possibility, the invention is not limited to a communication network in which the nodes are connected in a mesh topology.

The nodes (wireless access points) may communicate between each other using one wireless technology and may communicate with end users using another wireless technology. These wireless technologies may be distinguished by frequency or protocol. For example, in one implementation, the communications with end users may take place utilizing the Institute of Electrical and Electronics Engineers (IEEE) 802.11b wireless communication protocol (or one of the other 802.11x protocols). The 802.11b protocol currently enables communications to take place at 11 Mega bits per second (Mbps) at a frequency of 2.4 GigaHertz (GHz). Communications between nodes may take place, in this example, utilizing one of the IEEE 802.16x protocols, the Universal Mobile Telecommunication System (UMTS) wireless communications protocol, the IEEE 802.11a wireless communication protocol, or other emerging protocols such as IEEE 802.18. The 802.11a protocol currently enables communications to take place at 54 Mbps at a frequency of 5 GHz. Other protocols transmitting at other frequencies may be utilized as well and the invention is not limited to this particular example. For example, nodes could also be configured to support the IEEE 802.11g standard, which supports both 802.11a and 802.11b, HiperLAN or Bluetooth.

Although the invention may be implemented in a wireless ad-hoc mesh network, the invention is not limited in this regard. Rather, the invention may be used more broadly with other types of communication technology, such as wireline, infra red, acoustic, and numerous other types of communication technology.

Figure 8:
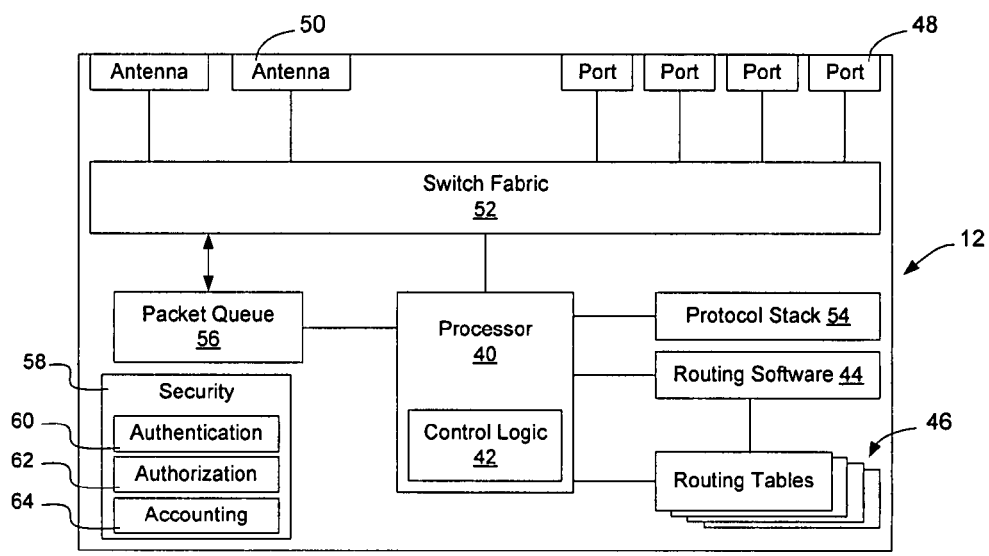
FIG. 8 is a functional block diagram of a network element configured to implement distance limited flooding of link state advertisements according to an embodiment of the invention.

FIG. 8 is a functional block diagram of a focal node configured to implement an embodiment of the invention. The embodiment illustrated in FIG. 5 is a wireless focal node having wireless antennae configured to enable the focal node to communicate using one or more wireless protocols. The invention is not limited to this embodiment as a wireline device may be used as well.

As shown in FIG. 8, the focal node 12 generally includes a processor 40 containing control logic 42 configured to perform functions described to enable the focal node to limit LSA distribution on the network. The processor may interface routing software 44 and routing tables 46 to enable it to perform the functions described above in connection with FIGS. 1-7.

The network element may be provided with one or more components (hardware and/or software) to enable it to communicate on a communication network. In the embodiment illustrated in FIG. 8, the network element includes a plurality of network ports 48 and antennae 50 to enable the focal node to communicate using both wireline and wireless technologies. The invention is not limited to one or more specific types of communication technology.

The various interfaces (wireless and wireline) may be connected to a switch fabric 52 that operates under the control of the processor 40. A protocol stack 54 containing data and instructions configured to enable the focal node to participate in protocol exchanges on the network may optionally be included. Other conventional network element features, such as a packet queue 56 configured to temporarily store protocol data units for transmission on the network, may also be included. Additionally, the focal node may include a security module 58 containing an authentication module 60 configured to authenticate users, devices, or connections on the network, an authorization module 62 configured to determine appropriate authorization control information to prevent unauthorized access to the network, and an accounting module 64 configured to enable accounting entries to be established for communication sessions on the network. Other modules may be included as well and the invention is not limited to a particular implementation of the network device.

The functions described above may be implemented as a set of program instructions that are stored in a computer readable memory within the network element and executed on one or more processors within the network element. However, it will be apparent to a skilled artisan that all logic described herein can be embodied using discrete components, integrated circuitry such as an Application Specific Integrated Circuit (ASIC), programmable logic used in conjunction with a programmable logic device such as a Field Programmable Gate Array (FPGA) or microprocessor, a state machine, or any other device including any combination thereof. Programmable logic can be fixed temporarily or permanently in a tangible medium such as a read-only memory chip, a computer memory, a disk, or other storage medium. Programmable logic can also be fixed in a computer data signal embodied in a carrier wave, allowing the programmable logic to be transmitted over an interface such as a computer bus or communication network. All such embodiments are intended to fall within the scope of the present invention.

It should be understood that various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of controlling the dissemination of routing information on a communication network without requiring flooding areas to be pre-defined on the communication network, the method comprising the steps of:

defining a maximum flooding radius for each link state advertisement to be flooded on the network, the maximum flooding radius enabling dissemination of the link state advertisement to be controlled on the network; and preventing, by each network element on the communication network, link state advertisements from flooding beyond their maximum flooding radius to control the dissemination of routing information by each node on the communication network without requiring flooding areas to be pre-defined on the communication network to thereby implement radius limited dissemination of routing information by each node on the communication network.

2. A network topology, comprising:
a plurality of OSPF routers interconnected in a network, each of said plurality of OSPF routers being configured to define a maximum flooding radius for link state advertisements to be flooded on the network, the maximum flooding radius enabling dissemination of the link state advertisement to be controlled on the network; and
each of the plurality of OSPF routers being further configured to prevent link state advertisements from flooding beyond their maximum flooding radius to control the dissemination of routing information by each of the plurality of OSPF routers on the network without requiring flooding areas to be pre-defined on the network, to thereby implement radius limited dissemination of routing information by each of the plurality of OSPF routers on the network, such that not every OSPF router within the an OSPF area receives every Link State Advertisement (LSA).

3. The network topology of claim 2, wherein the plurality of OSPF routers are interconnected in an ad-hoc wireless mesh network.

4. The network topology of claim 2, wherein the network is configured such that LSAs are disseminated only a predefined distance within the OSPF area.

5. The network topology of claim 2, wherein a subset of the OSPF routers are focal nodes.

6. The network topology of claim 5, wherein the network is configured such that LSAs are disseminated only a predetermined distance within the OSPF area.

7. The network topology of claim 6, wherein the predetermined distance is selected such that each LSA is received by at least two focal nodes.

8. The network topology of claim 6, wherein nodes on the network other than focal nodes are configured to maintain a routing table containing information obtained from LSAs, said routing table containing information associated with at least two focal nodes.

9. The network topology of claim 5, wherein the focal nodes are area border routers to an OSPF backbone area.

10. The network topology of claim 9, wherein the focal nodes on the OSPF backbone area are configured to disseminate link state information for nodes in their local area, their local area being defined as that portion of the network from which the focal nodes receive LSAs.

11. A network node, comprising:
ports interconnected by a switch fabric to enable the network node to communicate on a network; and
control logic configured to inspect a link state advertisement received from the network, ascertain link state information from the link state advertisement, determine a relevance of the link state information; and selectively drop the link state advertisement if the link state information is not relevant;
the control logic being further configured to enable the network node to participate in defining a maximum flooding radius for each link state advertisement to be flooded on the network, the maximum flooding radius for a particular link state advertisement enabling dissemination of that particular link state advertisement to be controlled on the network; and
the control logic being still further configured to enable the node to prevent link state advertisements from flooding beyond their maximum flooding radius to control the dissemination of routing information by the node on the communication network without requiring flooding areas to be pre-defined on the communication network to thereby implement radius limited dissemination of routing information by the node and a plurality of similarly configured other nodes on the communication network.

12. The network node of claim 11, wherein the relevance is a sum of link costs associated with the link state advertisement.

13. The network node of claim 11, further comprising a routing table, and wherein the control logic is further configured to update information in the routing table from the link state information contained in the link state advertisement if the link state information is determined to be relevant.

14. The network node of claim 11, further comprising a routing table, and wherein the control logic is further configured to update information in the routing table from the link state information contained in the link state advertisement, and wherein the control logic is configured to selectively drop the link state advertisement if the link state information contained in the link state advertisement is not likely to be relevant to another node on the network.

* * * * *